(12) United States Patent
Song et al.

(10) Patent No.: US 11,333,086 B1
(45) Date of Patent: May 17, 2022

(54) SYSTEM FOR VARIABLY CONTROLLING ENGINE-ON LINE IN CONSIDERATION OF COOLING AFTER FATC ENGINE IS TURNED ON

(71) Applicants: HYUNDAI MOTOR COMPANY, Seoul (KR); KIA CORPORATION, Seoul (KR)

(72) Inventors: Min-Seok Song, Gwacheon-si (KR); Jee-Wook Huh, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/325,786

(22) Filed: May 20, 2021

(30) Foreign Application Priority Data

Nov. 4, 2020 (KR) .......................... 10-2020-0146256

(51) Int. Cl.
 *F02D 35/00* (2006.01)
(52) U.S. Cl.
 CPC ................................. *F02D 35/00* (2013.01)
(58) Field of Classification Search
 CPC .. F02D 35/00; F01P 2250/24; F02N 220/023; F02N 220/0804; F02N 19/10; F02N 11/084; F02N 11/0833; B60H 1/00778
 See application file for complete search history.

(56) References Cited

U.S. PATENT DOCUMENTS

| | | | | |
|---|---|---|---|---|
| 6,532,926 B1* | 3/2003 | Kuroda | .............. | B60H 1/00778 123/179.4 |
| 2003/0183184 A1* | 10/2003 | Murray | .................... | F02N 19/10 123/142.5 R |
| 2012/0125907 A1* | 5/2012 | Chernyavsky | ..... | B60H 1/00378 219/202 |
| 2014/0158784 A1* | 6/2014 | Lundberg | ........... | B60H 1/00885 237/5 |
| 2015/0159615 A1* | 6/2015 | Van Wiemeersch | ......................... | F02N 11/0807 701/113 |
| 2020/0378352 A1* | 12/2020 | Cosgrove | ........... | B60H 1/00285 |

FOREIGN PATENT DOCUMENTS

KR  10-2019-0079138  7/2019

* cited by examiner

*Primary Examiner* — George C Jin
(74) *Attorney, Agent, or Firm* — Lempia Summerfield Katz LLC

(57) ABSTRACT

A control method capable of variably applying an existing engine-on line includes: a prediction degree calculation unit to predict a degree to which a temperature of a coolant at a current point after the engine is turned off reaches a target temperature by a request of full automatic temperature control (FATC); a factor determination unit to set reference ranges divided based on an extent that the temperature is close to the target temperature, and to determine a factor value for each reference range so that a predetermined existing engine-on line or a predetermined existing engine-off line is varied by required power; and an engine on/off line determination unit configured to determine a corrected engine-on line or a corrected engine-off line by calculating the existing engine-on line or the existing engine-off line and the factor value in the reference range in which a calculation value is positioned.

6 Claims, 6 Drawing Sheets

FIG.1 "PRIOR ART"
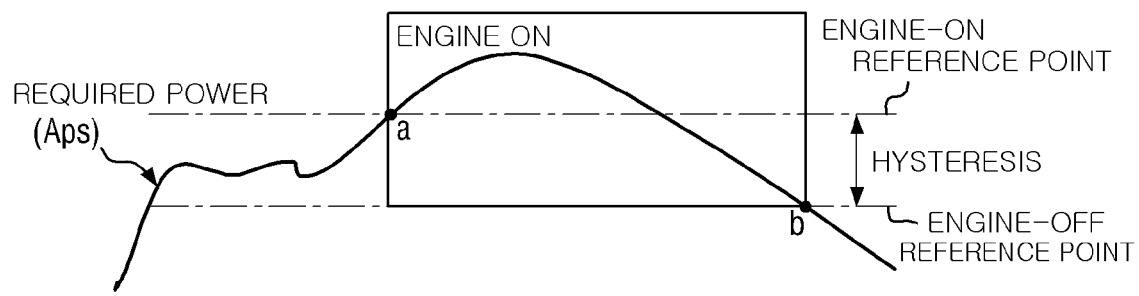
FIG.2 "PRIOR ART"
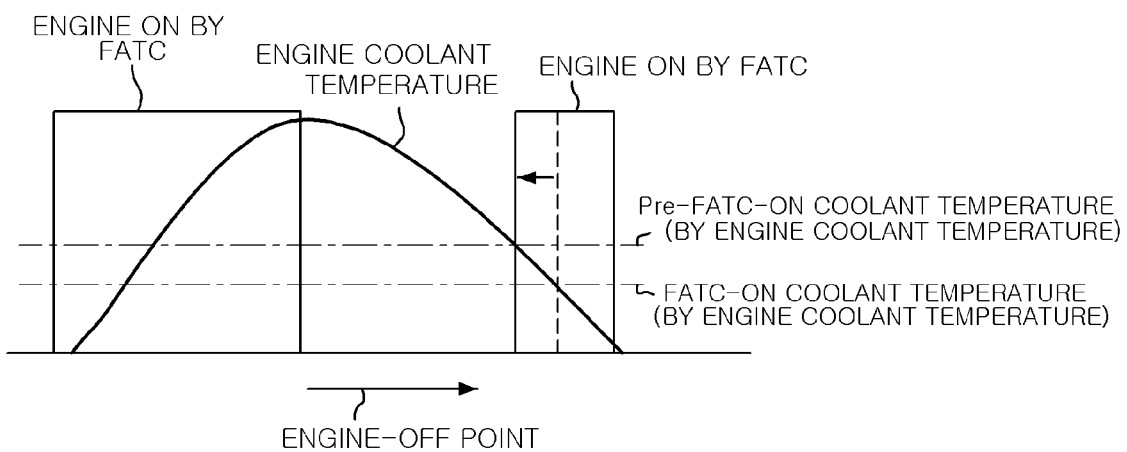

|  | DECREASE IN ENGINE ON LINE | DECREASE IN ENGINE OFF LINE |
|---|---|---|
| Step 3 | ABSENCE | ABSENCE |
| Step 2 | SMALL | ABSENCE |
| Step 1 | MIDDLE | ABSENCE |
| Step 0 | LARGE | PRESENCE |

SYSTEM FOR VARIABLY CONTROLLING ENGINE-ON LINE IN CONSIDERATION OF COOLING AFTER FATC ENGINE IS TURNED ON

CROSS-REFERENCE TO RELATED APPLICATIONS

This application claims priority to and the benefit of Korean Patent Application No. 10-2020-0146256, filed on Nov. 4, 2020, the entire contents of which are incorporated herein by reference.

FIELD

The present disclosure relates to a method of variably controlling an engine-on line in consideration of cooling after a FATC (full automatic temperature control) engine is turned on.

BACKGROUND

The statements in this section merely provide background information related to the present disclosure and may not constitute prior art.

A vehicle is mounted with an HVAC (heating, ventilation, and air conditioning) system to adjust an indoor temperature and establish a comfortable indoor environment.

Recently, a FATC (full automatic temperature control) system is applied to the vehicle, and the FATC system maintains a comfortable environment by automatically adjusting an indoor temperature based on a temperature set by a driver or a passenger.

When the user sets a temperature in the FATC system, an air conditioning controller receives detection signals from sensors such as a solar radiation sensor configured to detect solar radiation, an outdoor temperature sensor configured to detect a temperature of outside air, and an indoor temperature sensor configured to detect an indoor temperature of the vehicle in order to control the indoor temperature.

The air conditioning controller calculates a thermal load of the interior of the vehicle based on detection values from the respective sensors and determines a discharge mode, a discharge temperature, a discharge direction, and a discharge flow rate in consideration of an air conditioning load corresponding to the thermal load.

In order to control the indoor temperature and the operation of the system, the air conditioning controller further receives detection values from sensors such as a discharge temperature sensor configured to detect a discharge temperature which is a temperature of air being discharged (i.e., a temperature of air in a discharge port), a water temperature sensor configured to detect a temperature of an engine coolant, and an evaporator temperature sensor configured to detect a temperature of an evaporator.

A heat source for heating the interior of the vehicle in the winter season is an engine, and a high-temperature coolant heated by the engine flows to heat the interior of the vehicle. The engine coolant exchanges heat with air-conditioning air (inside air and outside air) while passing through a heater core.

That is, the air-conditioning air is heated by exchanging heat with the engine coolant in the heater core while passing through the periphery of the heater core. The air-conditioning air heated in this manner is discharged into the interior of the vehicle, thereby heating the interior of the vehicle.

In the FATC system, when a temperature (coolant temperature) of the engine coolant or a temperature (discharge temperature) of the air in the discharge port of the HVAC system in the vehicle is lower than a temperature desired to heat the interior of the vehicle, the air-conditioning controller (FATC controller) requests the engine to forcibly operate. Based on the request of the air-conditioning controller, and an engine control unit (ECU) forcibly operates the engine.

Meanwhile, a hybrid vehicle refers to a vehicle that travels using an engine and a motor as driving sources. Because the hybrid vehicle travels by using both fossil fuel energy and electrical energy, the hybrid vehicle is an environmentally-friendly vehicle capable of reducing exhaust gas and improving fuel economy. In addition, since the hybrid vehicle is equipped with the engine, the interior of the vehicle may be heated by using heat from the engine.

A TMED (transmission mounted electric device) type hybrid vehicle selects traveling modes in accordance with operating conditions. In this case, the traveling modes include an EV (electric vehicle) mode in which only power of the motor is used, and an HEV (hybrid electric vehicle) mode in which both power of the engine and power of the motor are used.

The traveling modes include a regeneration mode in which the hybrid vehicle recovers electrical energy from kinetic energy of the vehicle by a power generation operation of the motor and charges a battery while the hybrid vehicle is braked or coats by means of inertia.

The hybrid vehicle may stop the engine while the hybrid vehicle is stationary, and the hybrid vehicle may travel in the EV mode using the motor while the hybrid vehicle travels at a low speed or with low torque.

The hybrid vehicle has higher fuel economy than a vehicle equipped with a general internal combustion engine because the hybrid vehicle may operate with high-efficient operation point of the engine and optimum efficiency of the entire hybrid system by optimally distributing torque from the engine and the motor under a condition in which the vehicle travels by the operation of the engine like the HEV mode.

However, when the vehicle travels under a low-temperature condition in the winter season, it is desired to operate and maintain the engine in an idling state in order to provide heating performance even in an EV traveling state, a stationary state, a braking state, or a coasting state in which the engine may be turned off to improve fuel economy. As a result, fuel economy may be decreased in comparison with when the vehicle travels under a general traveling condition.

Referring to FIG. 1, on/off control of a general engine is performed by hysteresis control. That is, the control is performed to vary a reference value for which the engine is turned on and a reference value for which the engine is turned off, such that the engine is turned on when required power of the vehicle becomes higher than the reference value for which the engine is turned on, and the engine is turned off when the required power of the vehicle becomes lower than the reference value for which the engine is turned off.

However, in a case in which the engine on/off control is not performed to drive the vehicle (e.g., in a case in which the vehicle is stationary), the engine is forcibly operated only for heating the interior of the vehicle, and fuel is consumed by the engine, which may cause a deterioration in fuel economy of the vehicle.

In order to solve the problem of the deterioration in fuel economy as described above, a pre-FATC concept may be introduced in which a temperature of the engine coolant is maintained and managed at a predetermined level or higher by operating the engine in advance under a predetermined condition before a request for forcibly operating the engine for heating the interior of the vehicle.

Referring to FIG. 2, the pre-FATC refers to a concept in which the engine is turned on, when the vehicle travels instead of when the vehicle is stationary, by turning on the engine in advance when the temperature of the coolant is decreased after an engine-off point. In this case, a temperature of the coolant for the pre-FATC (pre-FATC engine-on coolant temperature) is set to be higher than the temperature of the coolant in the related art at which the engine is turned on by the request of the FATC.

That is, the pre-FATC for maintaining the engine coolant at a predetermined temperature or higher is also ultimately used to heat the interior of the vehicle. Therefore, the operations of the engine for heating the interior of the vehicle may be classified into an existing operation of forcibly operating the engine to raise a temperature of the coolant when the temperature of the coolant does not satisfy the heating condition, and a pre-operation of the engine, the main object of which is to maintain and manage the engine coolant at a predetermined temperature or higher.

Even though the temperature of the coolant when the engine is turned on by the pre-FATC is higher than the temperature of the coolant when the engine is turned on by the FATC, the Pre-FATC cannot sometimes be applied because an actual difference in temperature therebetween is small. In addition, if the temperature of the coolant is raised by turning on the engine by the pre-FATC in order to solve the problem, fuel economy may deteriorate because the engine is frequently turned on and off.

The engine cannot be turned on by the pre-FATC in a situation in which the vehicle is stationary, such that the temperature of the coolant is continuously decreased. In this case, because the pre-FATC logic is applied even in the situation in which the temperature of the coolant reaches the temperature at which the engine is turned on by the FATC and thus the engine is turned on, the engine cannot be turned off until the temperature of the coolant meets an engine-off line by the pre-FATC, which may cause an inefficient situation.

SUMMARY

The Pre-FATC in the related art is performed before the temperature of the coolant reaches the temperature of the coolant at which the engine is turned on by the FATC, but the pre-FATC is performed without variation when the temperature of the coolant reaches a predetermined temperature, and as a result, there is a problem in that efficiency of the pre-FATC is low. The present disclosure provides flexibility and controllability of an operation of an engine during pre-FATC by variably controlling an engine-on line or an engine-off line based on a probability that after an engine-off point, a temperature of a coolant at the current point reaches a temperature at which the engine is turned on by FATC.

An exemplary form of the present disclosure a system for variably controlling an engine-on line in consideration of cooling after an FATC engine is turned on, includes: a prediction degree calculation unit configured to predict a degree to which a temperature of a coolant at a current point after the engine is turned off reaches a target temperature, which is a temperature at which the engine is turned on, by a request of a full automatic temperature control (FATC); a factor determination unit configured to set reference ranges divided based on an extent that the temperature is close to the target temperature, the factor determination unit being configured to determine a factor value for each reference range so that a predetermined existing engine-on line or a predetermined existing engine-off line is varied by required power; and an engine on/off line determination unit configured to determine a corrected engine-on line or a corrected engine-off line by calculating the existing engine-on line or the existing engine-off line and the factor value in the reference range in which a calculation value is positioned.

The calculation value by the prediction degree calculation unit may be calculated based on Predic_FATC=|Eng on set−temp_T+e×ΔT|, in which Predic_FATC is a prediction degree calculation value, Eng on set is a temperature of the coolant at which the engine is turned on by a request of the FATC, temp_T is a temperature of the coolant at a current point (T point), e is a prediction degree application coefficient, and ΔT means a variation of a coolant average temperature for a period of time from an engine-off point to the current point.

The factor value may be determined to lower the existing engine-on line or the existing engine-off line for each reference range.

In this case, the factor value may be set as a value of 1 or less, and the factor value in the reference range may be set to be increased as the reference range becomes closer to the target temperature.

Meanwhile, among the reference ranges, a reference range closest to the target temperature may have both a factor value for lowering the existing engine-on line and a factor value for lowering the existing engine-off line.

The present disclosure predicts whether a temperature of the coolant reaches the temperature of the coolant, at which the engine is turned on by the FATC, from the engine-off point after the engine is turned on by the FATC, and as a result, it is possible to prevent the engine from being turned on by the idling operation of the vehicle while the vehicle is stationary by implementing the pre-FATC, thereby improving fuel economy.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view illustrating engine on/off control in the related art;

FIG. 2 is a view schematically illustrating Pre-FATC;

Figure 3:
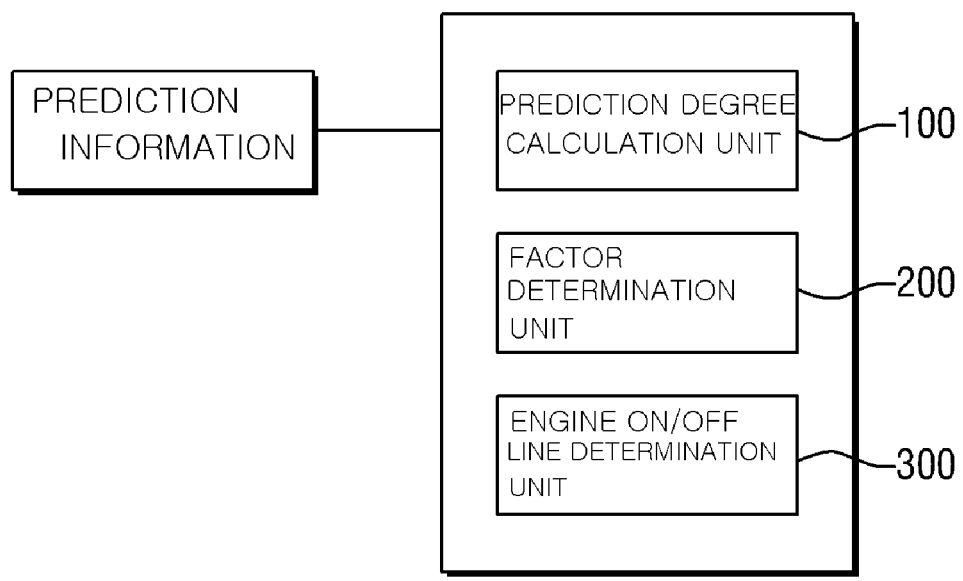
FIG. 3 is a view schematically illustrating a configuration of a system for variably controlling an engine-on line in consideration of cooling after an FATC engine is turned on according to the exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of a system for variably controlling an engine-on line in consideration of cooling after an FATC engine is turned on according to the present disclosure will be described in detail with reference to the drawings. Terms or words used herein should not be interpreted as being limited to a general or dictionary meaning and should be interpreted as a meaning and a concept which conform to the technical spirit of the present disclosure based on a principle that an inventor can appropriately define a concept of a term in order to describe his/her own present disclosure by the best method.

Figure 4:
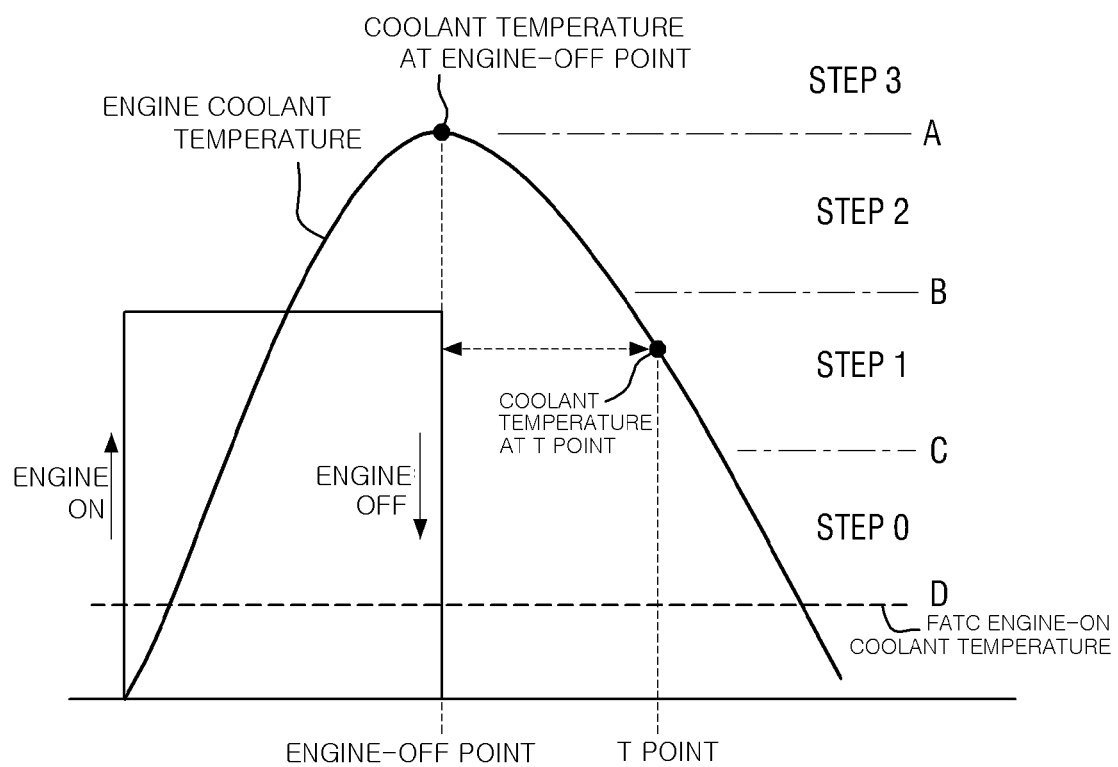
FIG. 4 is a graph illustrating temperatures of a coolant after an engine is turned on by FATC in an exemplary form of the present disclosure.
Figure 5:
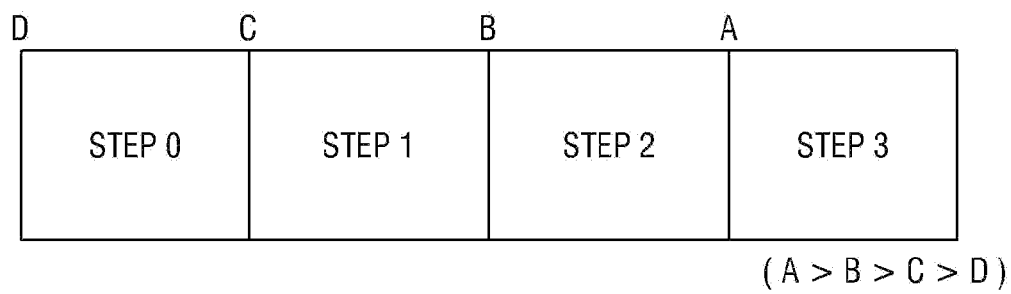
FIG. 5 is a view illustrating, for each section, reference ranges illustrated in the graph in FIG. 4.
Figures 6, 7:
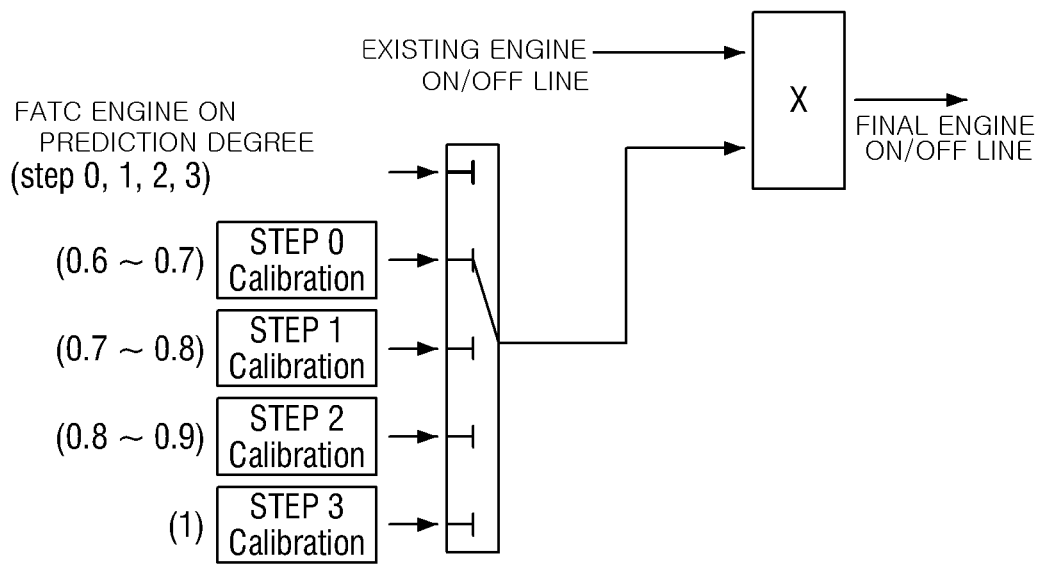
FIG. 6 is a view illustrating a process of producing a final engine on/off line by calculating an existing engine on/off line and factors according to an exemplary form of the present disclosure.
FIG. 7 is a table showing factor values for decreasing the engine-on line or the engine-off line in each reference range according to an exemplary form of the present disclosure.

FIG. 3 is a view schematically illustrating a configuration of a system for variably controlling an engine-on line in consideration of cooling after an FATC engine is turned on according to the exemplary form of the present disclosure, FIG. 4 is a graph illustrating temperatures of a coolant after an engine is turned on by FATC in accordance with the exemplary form of the present disclosure, FIG. 5 is a view illustrating, for each section, reference ranges illustrated in the graph in FIG. 4, and FIG. 6 is a view illustrating a process of producing a final engine on/off line by calculating an existing engine on/off line and factors according to the exemplary form of the present disclosure.

Referring to FIG. 3, the system for variably controlling the engine-on line in consideration of cooling after an FATC engine is turned on includes a prediction degree calculation unit 100, a factor determination unit 200, and an engine on/off line determination unit 300.

Also, the terms, such as 'unit' or 'module', etc., should be understood as a unit that processes at least one function or operation and that may be embodied in a hardware manner (e.g., a processor), a software manner, or a combination of the hardware manner and the software manner.

The prediction degree calculation unit 100 calculates a prediction degree which is a degree to which a current temperature of a coolant after an engine-off point by FATC reaches a temperature (hereinafter, referred to as 'target temperature') at which an engine is turned on by predetermined FATC.

FIG. 4 is a graph illustrating a state in which the temperature of the coolant is decreased from the engine-off point after the engine is turned on by the FATC. In this case, the prediction degree calculation unit 100 calculates a prediction value or probability that the current temperature of the coolant reaches the temperature at which the engine is turned on by the FATC. The prediction degree may be calculated based on the following calculation formula.

$$\text{Predic\_FATC} = (\text{Eng on set} - \text{temp}\_T) + e \times \Delta T \quad \text{<Calculation Formula>}$$

In this case, Predic_FATC is a prediction degree calculation value, Eng on set is a temperature of the coolant at which the engine is turned on by the request of the FATC, temp_T is a temperature of the coolant at a current point (T point), e is a prediction degree application coefficient, and $\Delta T$ is a variation of a coolant average temperature for a period of time from the engine-off point to the current point.

The prediction degree calculation unit 100 acquires information (prediction information illustrated in FIG. 3) of factors desired for the calculation formula by using various types of sensors mounted in the vehicle.

Referring to FIGS. 4 and 5, the reference range is set based on the extent that the temperature of the coolant is close to the target temperature. The reference range is divided based on boundaries including a plurality of reference values A, B, C, and D, a reference range between the reference values D and C is referred to as STEP 0, a reference range between the reference values C and B is referred to as STEP 1, a reference range between the reference values B and A is referred to as STEP 2, and a reference range larger than the reference value A is referred to as STEP 3. In this case, the reference value D may be set to be equal to the target temperature, and the reference value A may be set to be equal to the temperature of the coolant at the engine-off point. In the exemplary form of the present disclosure, the reference range is divided into the four steps, but the reference range may be divided into various numbers of steps.

Referring to FIG. 5, when the calculation value calculated by the prediction degree calculation unit 100 is larger than the reference value C and smaller than the reference value D, it can be said that the prediction degree is STEP 0. STEP 0 means that there is a high probability that the temperature of the coolant at the current point will reach the target temperature. Further, when the calculation value calculated by the prediction degree calculation unit 100 is larger than the reference value A, it can be said that the prediction degree is STEP 3. STEP 3 means that there is a low probability that the temperature of the coolant at the current point will reach the target temperature. The same principle also applies to STEP 1 and STEP 2.

In FIG. 4, the reference range (STEP 0 to STEP 3) is shown at one side of the graph for the temperature of the coolant so that it is easily understood whether the temperature at the current point will reach the target temperature.

The high probability that the temperature of the coolant at the current point will reach the target temperature means that there is a high probability that the engine is turned on by the FATC. That is, it is disadvantageous in terms of fuel economy that the engine is turned on to heat the interior of the vehicle when the temperature of the coolant is decreased after the engine is turned off. Therefore, it is desired to correct and lower the existing engine-on line, if possible, so that the engine is turned on while the vehicle travels. The reason is that the engine is easily turned on when the engine-on line is lowered. In addition, the low probability that the temperature of the coolant at the current point will reach the target temperature means that there is low probability that the engine will be turned on by the FATC. In this case, the existing engine-on line may be slightly corrected or used as it is.

The engine-on line is defined as a line that serves as a reference for turning on the engine when the temperature of the coolant decreases in the engine off state and the engine-off line is defined as a line that serves as a reference for turning off the engine when the temperature of the coolant increases in the engine on state.

For this reason, the factor determination unit 200 determines a factor value for correcting the existing engine-on line or the existing engine-off line for each reference range. Referring to FIG. 6, the factor value according to the exemplary form of the present disclosure has a value of 1 or less. The reason is to lower the engine on/off line value corrected by multiplying the existing engine on/off line value by the factor value. As illustrated in FIG. 6, the factor value in STEP 0 is 0.6 to 0.7, the factor value in STEP 1 is 0.7 to 0.8, the factor value in STEP 2 is 0.8 to 0.9, and the factor value in STEP 3 is 1. The factor value is increased as the reference range becomes closer to the target temperature.

However, the factor value is merely one exemplary form, and the factor value may be set as various values by experiments.

FIG. 7 is a table showing factor values for decreasing the engine-on line or the engine-off line in each reference range according to the exemplary form of the present disclosure.

Meanwhile, referring to FIG. 7, in the exemplary form of the present disclosure, the factor values may be set to be divided, for each reference range, into a factor value for lowering the engine-on line and a factor value for decreasing the engine-off line. As illustrated in FIG. 7, in STEP 0, both the factor value for lowering the engine-on line and the factor value for decreasing the engine-off line may be set. The reason why the factor value for the engine-off line is set in STEP 0 is to allow the engine to be turned on more efficiently when the vehicle travels than when the vehicle is stationary. As illustrated in FIG. 7, in STEP 3, the factor value is 1, such that the engine-on line and the engine-off line are not lowered.

The factor determination unit 200 selects the factor value in the reference range in which the calculation value calculated by the prediction degree calculation unit 100 is positioned, as a correction factor for the existing engine-on line or the existing engine-off line.

The engine on/off line determination unit 300 determines a final engine-on line or a final engine-off line by multiplying the value of the existing engine-on line or the existing engine-off line by the factor value determined by the factor determination unit 200.

Figure 8:
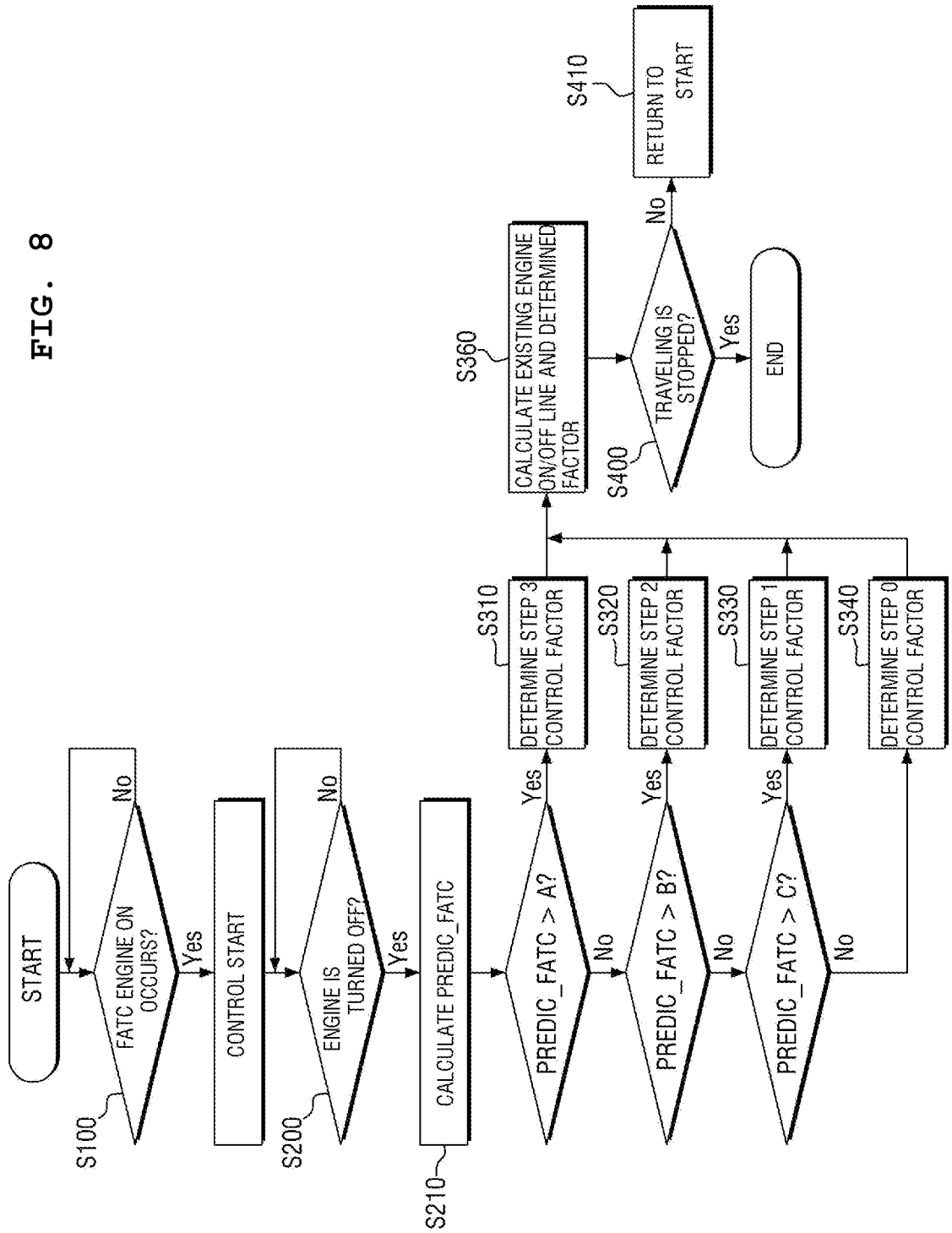
FIG. 8 is a flowchart showing a process of variably controlling an engine-on line in consideration of cooling after an FATC engine is turned on in one form of the present disclosure.

FIG. 8 is a flowchart showing a process of variably controlling an engine-on line in consideration of cooling after an FATC engine is turned on according to one exemplary form of the present disclosure.

Hereinafter, the process of variably controlling an engine-on line in consideration of cooling after an FATC engine is turned on according to the exemplary form of the present disclosure will be described with reference to FIG. 8.

First, whether the engine is turned on by the FATC is determined (S100). Unless the engine is turned on by the FATC, the control according to the present disclosure is not performed. Whether the engine is turned off after the engine is turned on is determined (S200). In this case, when the engine is not yet turned off, the engine is continuously monitored until the engine is turned off. The pre-FATC is performed because the temperature of the coolant in the engine is lowered from the point at which the engine is turned off after the engine is turned on by the FATC. In this case, the prediction degree calculation unit 100 calculates Predic_FATC (S210). As described above, the factor according to STEP 3 is determined when the value of Predic_FATC is larger than the reference value A (S310). The factor according to STEP 2 is determined when the value of Predic_FATC is between the reference values A and B (S320). The factor according to STEP 1 is determined when the value of Predic_FATC is between the reference values B and C (S330). The factor according to STEP 0 is determined when the value of Predic_FATC is between the reference values C and D (S340). Thereafter, the engine-on line or the engine-off line, which is corrected by multiplying the existing engine-on line or the existing engine-off line by the factor value, is calculated (S360).

Thereafter, whether the operation of the vehicle is stopped is determined (S400). When the operation of the vehicle is stopped, the control according to the exemplary form of the present disclosure is ended. Unless the operation of the vehicle is stopped, the process returns to Start and the determination is performed again (S410). That is, the engine-on line or the engine-off line according to the exemplary form of the present disclosure may be continuously corrected based on the calculation value calculated by the prediction degree calculation unit while the vehicle travels. In this case, the correction value lowers the engine-on line or the engine-off line so that the engine-on state is maintained while the vehicle travels, if possible, rather than when the vehicle is stationary. As a result, it is possible to prevent a situation in which the engine is turned on to heat the interior of the vehicle after the engine is turned off, thereby improving fuel economy.

The present disclosure has been described with reference to the limited exemplary forms and the drawings, but the present disclosure is not limited thereto. The described exemplary forms may be variously changed or modified by those skilled in the art to which the present disclosure pertains within the technical spirit of the present disclosure.

What is claimed is:

1. A system for variably controlling an engine-on line after a full automatic temperature control (FATC) engine is turned on, the system comprising:
   a prediction degree calculation unit configured to predict a degree to which a temperature of a coolant at a current point after the engine is turned off reaches a target temperature at which the engine is turned on, by a request of a full automatic temperature control (FATC);
   a factor determination unit configured to: set reference ranges divided based on an extent that the temperature is close to the target temperature, and determine a factor value for each reference range of the reference ranges so that a predetermined existing engine-on line or a predetermined existing engine-off line is varied by a required power; and
   an engine on/off line determination unit configured to determine a corrected engine-on line or a corrected engine-off line by calculating the existing engine-on line or the existing engine-off line and the factor value in the reference ranges in which a calculation value calculated by the prediction degree calculation unit is positioned.

2. The system of claim 1, wherein the calculation value by the prediction degree calculation unit is calculated as:

$$\text{Predic\_FATC} = |(\text{Eng on set} - \text{temp\_}T) + e \times \Delta T|, \text{ and}$$

where: Predic_FATC is a prediction degree calculation value, Eng on set is a temperature of the coolant at which the engine is turned on by a request of the FATC, temp_T is a temperature of the coolant at a current point (T point), e is a prediction degree application coefficient, and $\Delta T$ means a variation of a coolant average temperature for a period of time from an engine-off point to the current point.

3. The system of claim 1, wherein the factor value is determined to lower the existing engine-on line or the existing engine-off line for each reference range.

4. The system of claim 3, wherein the factor value is set as a value of 1 or less.

5. The system of claim 3, wherein the factor value in the reference ranges is increased as the reference ranges become closer to the target temperature.

6. The system of claim 1, wherein among the reference ranges, a reference range closest to the target temperature has both a factor value for lowering the existing engine-on line and a factor value for lowering the existing engine-off line.

\* \* \* \* \*